United States Patent [19]

Tallerico, Jr.

[11] 4,249,446
[45] Feb. 10, 1981

[54] COPING TRACING MACHINE

[76] Inventor: Peter Tallerico, Jr., 1023 Cleveland Ave., Niagara Falls, N.Y. 14305

[21] Appl. No.: 20,825

[22] Filed: Mar. 15, 1979

[51] Int. Cl.³ .............................................. B23D 53/00
[52] U.S. Cl. ........................................ 83/789; 83/565; 144/144 R
[58] Field of Search .................. 83/565, 581, 661, 794, 83/788, 789; 144/137, 144 R, 144 A–D; 51/100 P; 409/121

[56] References Cited

U.S. PATENT DOCUMENTS

| 429,213 | 6/1890 | Jacobson | 144/144 A |
| 860,486 | 7/1907 | King | 83/565 |
| 3,254,684 | 6/1966 | Hawkins | 83/789 |
| 3,473,580 | 10/1969 | Dunn et al. | 83/788 |
| 3,942,566 | 3/1976 | Schmidt | 83/565 |
| 3,979,988 | 9/1976 | Best | 83/661 |

Primary Examiner—Frank T. Yost
Assistant Examiner—K. Bradford Adolphson
Attorney, Agent, or Firm—Ashlan F. Harlan, Jr.

[57] ABSTRACT

Apparatus for duplicating on the end of a piece of molding, the surface contour of said molding, comprising adjustable holding means for a piece of molding, a band saw for cutting said molding piece transversely, means for holding a sample of said molding oriented substantially 90° from said piece, tracing means operatively connected to said saw for tracing the surface contour of said sample, and means for moving said tracing means and said saw together in sawing through said piece of molding.

7 Claims, 11 Drawing Figures

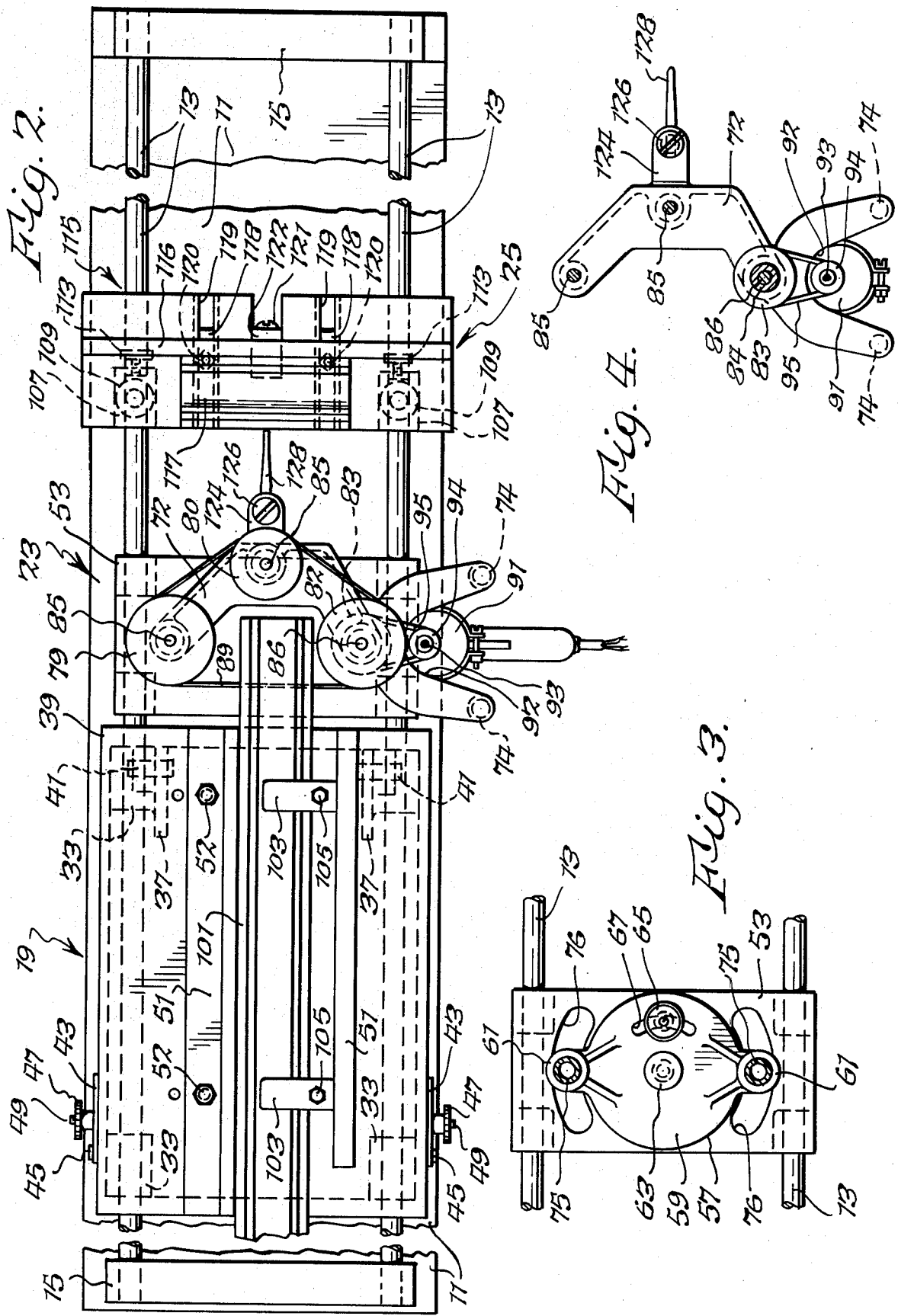

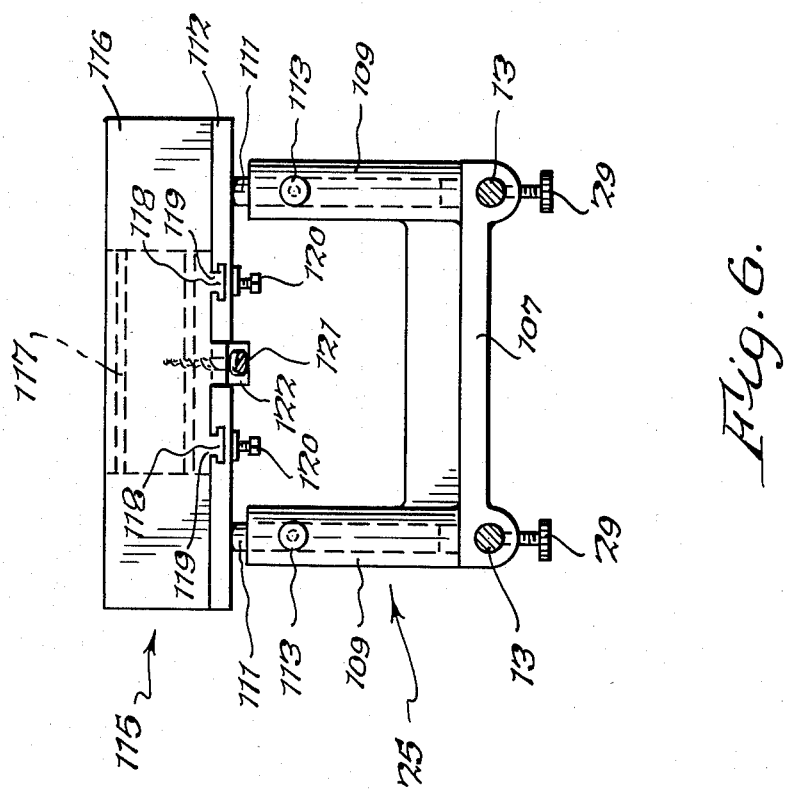
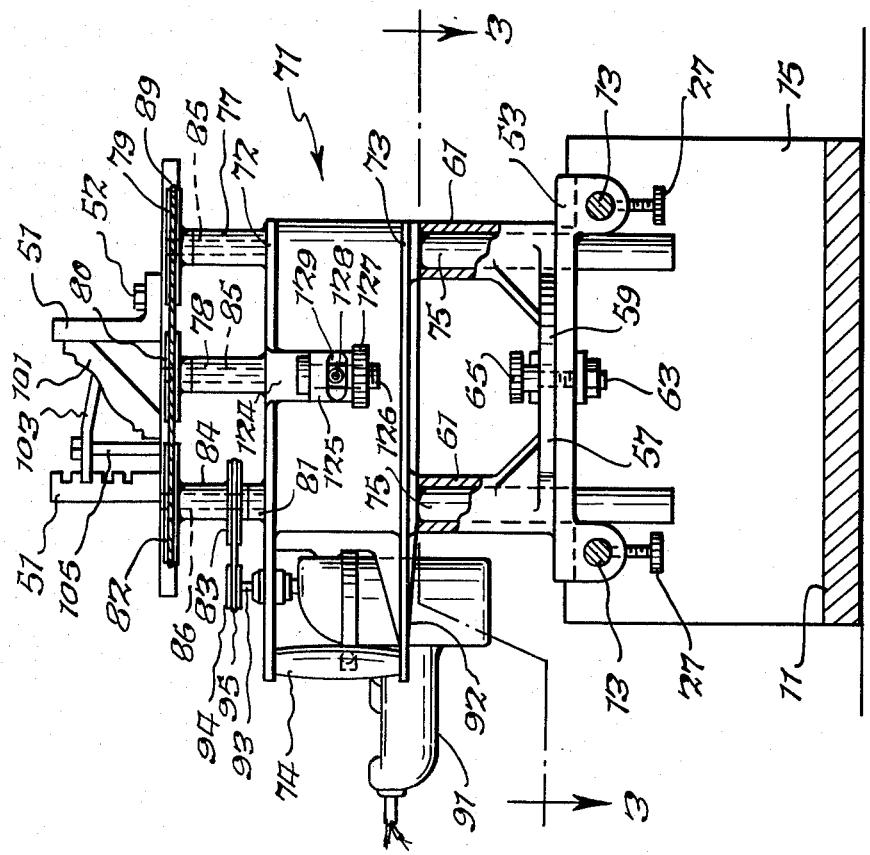

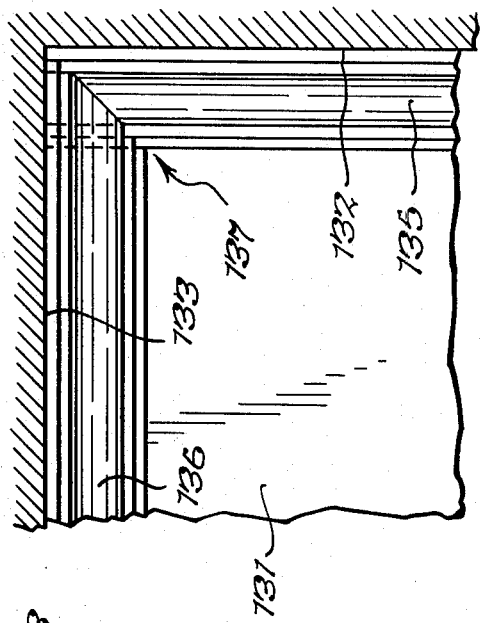
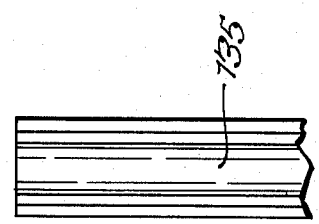
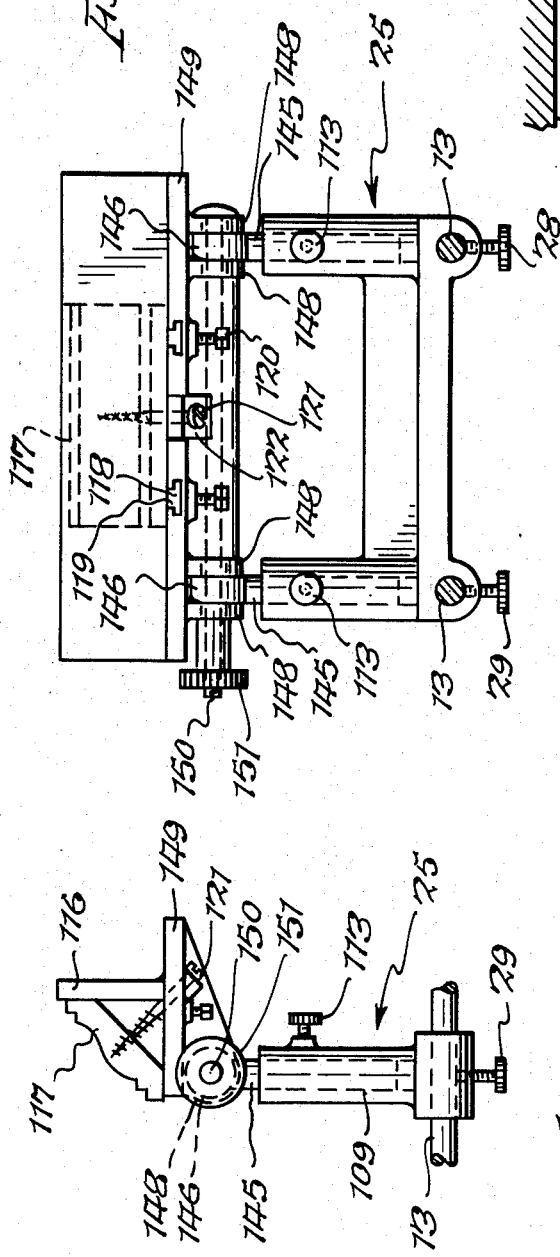
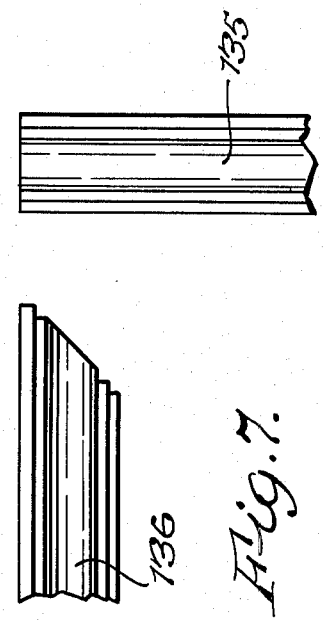

COPING TRACING MACHINE

BACKGROUND OF THE INVENTION

The invention of the present application relates to machines for woodworking and is particularly concerned with a machine for contouring the ends of molding to form corner joints which appear to be mitered.

Quarter round, and similarly configured molding has been commonly used by builders and carpenters for many years to provide a suitable, finished appearance at the juncture of walls and floors and of walls and ceilings. In spite of this long use, corner joints are still formed either by providing miter cuts in each of the two corner-forming portions, or by handforming the end of one portion to overfit the other portion. Considerable skill is required in forming accurately mitered ends even with simple shapes like quarter round in those instances in which the walls meet at a corner which is not exactly ninety degrees. Mitering interior angles is often faulty and is rarely done by mechanics of ability, because of the tendency of one or the other of the joints to slip past its fellow, thus spoiling the intersection. On the other hand, the difficulty of hand-forming contoured ends is even more considerable and the difficulty is compounded when the shape of the molding used is more complex than that of quarter round.

SUMMARY OF THE INVENTION

In forming coped joints in accordance with the present invention a piece of suitable molding is clamped in adjustable supporting means and another piece of molding, identical with the first, is mounted at an angle of approximately 90° from the first piece. Between the two pieces of molding there is provided a cutter assembly which comprises a motor-driven bandsaw which has a round, flexible, spiral-cut blade that travels transversely of the first molding piece and means for moving said bandsaw with respect to said first piece of molding. Said cutter assembly carries a tracing head having a needle or pointer, the tip of which is adapted to engage and trace the surface contour of the second molding piece. The tracing head and bandsaw are connected whereby movement of the former as the needle or pointer follows the molding contour causes corresponding movement of the latter both longitudinally and laterally with respect to the first molding piece and thereby cuts the end of the latter in a shape duplicating the surface contour of the molding.

SHORT DESCRIPTION OF THE DRAWINGS

FIG. 2 is a plan view, with parts omitted for clarity, of the machine illustrated in FIG. 1;

FIG. 3 is a fragmentary horizontal sectional view taken on the line 3—3 of FIG. 5;

FIG. 4 is a fragmentary horizontal sectional view taken on the line 4—4 of FIG. 1;

FIG. 5 is a vertical sectional view taken on the line 5—5 of FIG. 1;

FIG. 6 is an end detail view of the specimen of sample holder portion of the machine illustrated in FIG. 1;

FIG. 7 is a fragmentary side view of a piece of molding cut at one end by the machine of the invention;

FIG. 8 is a fragmentary view of another piece of said molding having an uncut end;

FIG. 9 is a fragmentary view of a room, looking upwardly at the ceiling, in which the molding around the top of the walls has a corner joint obtainable by the combination of the molding pieces shown in FIGS. 7 and 8;

FIG. 10 is a detail view in elevation of a modified form of a specimen or sample holder usable with the present invention; and FIG. 11 is another view, at a 90° angle, of such modification.

THE INVENTION

Figure 1:
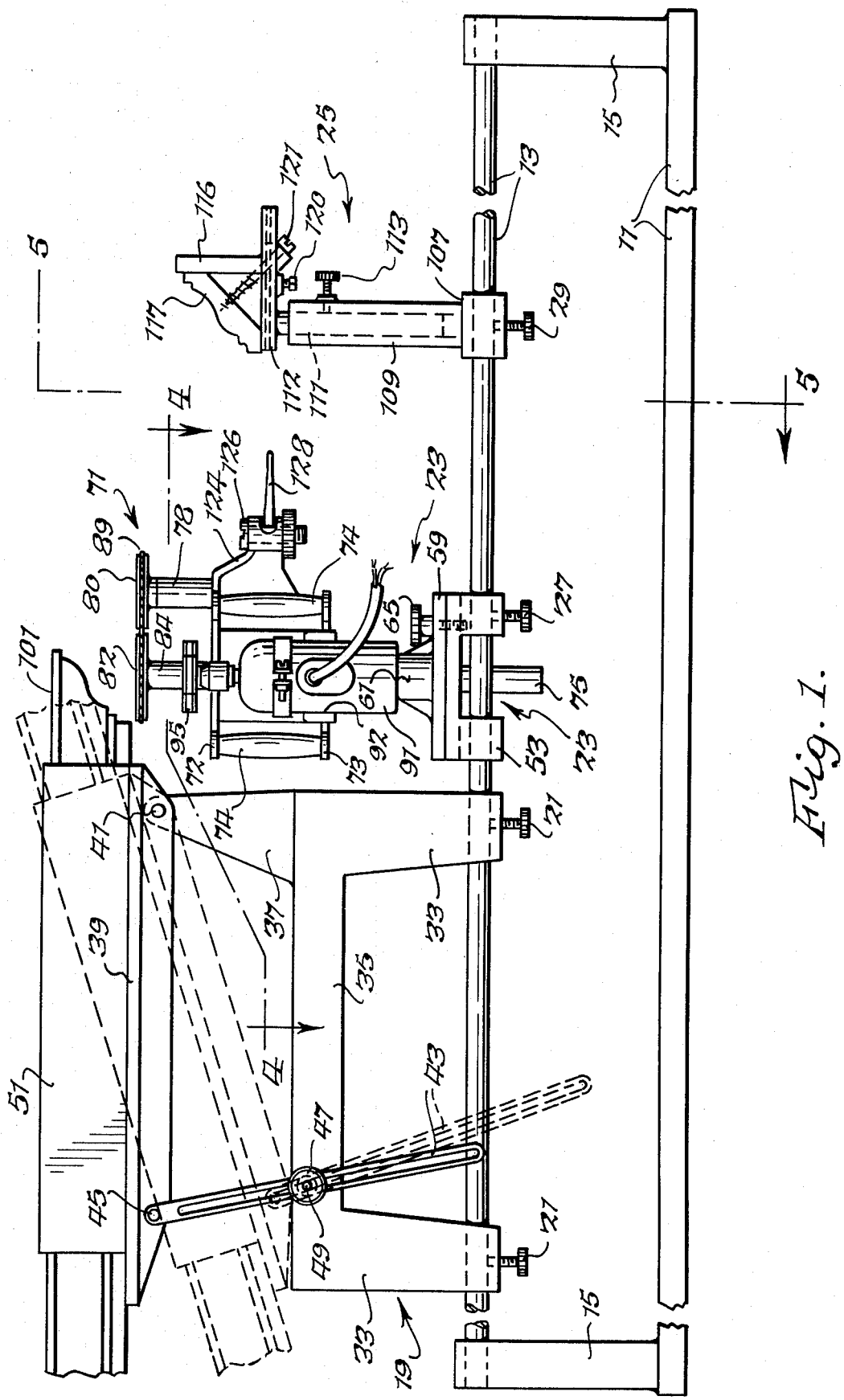
FIG. 1 is a side elevation of a machine in accordance with the present invention showing a sample of molding and a matching piece of molding contoured to provide a joint.

The machine of the present invention comprises a base 11 on which a pair of longitudinally extending, laterally spaced rails 13 are supported and secured by end brackets 15. Slidably supported on the rails 13 are a work-clamping assembly 19 which is ordinarily kept in fixed position on the rails 13 by thumb screws 21 that engage the latter, a cutter assembly 23, and a tracing assembly 25. The cutter assembly and tracing assembly may be adjustably positioned on the rails 13, with respect to the work-clamping assembly 19, by thumb screws 27 and 29, respectively, that engage the rails.

The work-clamping assembly 19 comprises legs 33 having holes therethrough for reception of the rails 13 on which they are slidable and for carrying the thumb screws 21 that engage the rails. A stage or platform 35, supported by the legs 33 and preferably integral therewith, has a pair of brackets 37 on the upper surface thereof adjacent the end of the stage proximate to the cutter assembly 23. A table or bench 39 is pivotally mounted on the brackets 37 by pins or the like 41 so that it is capable of substantial angular movement in a vertical plane. The bench 39 is secured in adjusted angular position by slotted links 43 pivotally secured by suitable means such as screws 45 to opposite sides of the bench adjacent the free end thereof. Lock nuts 47 on studs 49 mounted on the sides of the stage 35 and slidably received in the slots of the links 43 hold the bench 39 in adjusted position. The bench carries on its upper surface a pair of spaced parallel, longitudinally extending fences 51 which may be mounted and secured thereon in any suitable manner. Preferably, at least one of said fences is adjustably mounted for lateral movement, as by machine screws 52, to permit variation in the size of work pieces.

The cutter assembly 23 comprises a base 53 slidably mounted on the rails 13 between the work-clamping assembly 19 and the tracing assembly 25. Thumb screws 27 are carried by the base 53 and engage the rails to retain the assembly in adjusted longitudinal position with respect to the machine base 11 and the work-clamping assembly. Rotatably mounted on the base 53 is a vertical stand 57 which comprises a rotatable base plate 59 resting on the base 53 and carrying diametrically opposed, upwardly extending, hollow posts 61, preferably integral with the base plate. The base plate 59 rotates about a bolt 63 engaged in a hole in the base 53 and is locked in adjusted angular position by a thumb screw 65 threadedly engaged in said base and passing through an arcuate slot 67 in the base plate.

The stand 57 carries a cutting head 71. The latter has a frame that comprises upper and lower frame plates 72 and 73, respectively, that are rigidly fastened together in a suitable manner and may be formed integrally. The frame plates 72 and 73 are joined by spaced handles 74 that serve to manually move and guide the cutter assembly. Projecting downwardly from the frame of the cutting head 71 and preferably formed integrally with the lower frame plate 73 are a pair of laterally spaced supporting members, e.g. rods or tubes 75 which are slidable in the hollow posts 61 of the plate 59 and are adapted for reciprocating vertical movement therein. The rods or tubes 75 extend downwardly through arcuate slots 76 in the base 53 to allow pivotal movement of the stand 57 on the base.

The upper frame plate 72 is provided with a pair of upstanding bosses 77, 78 preferably integral therewith. The bosses 77, 78 carry grooved pulleys 79 and 80, respectively. These pulleys are mounted for rotation on vertical shafts 85 carried in the bosses 77, 78 and, if desired, may contain ball bearings (not shown). Another boss 81 projecting upwardly from the upper frame plate 72 carries on a similar vertical shaft 86 a pair of grooved pulleys 82 and 83. The latter are coaxially mounted on a spindle 84 for rotation therewith. The pulleys 79, 80 and 83 carry a flexible, spiral-cut, bandsaw blade 89. Such a blade cuts in any direction since the saw teeth project from all sides thereof.

Power for the bandsaw blade is provided by an electric motor suitably mounted between the handles 74. As illustrated, an electric hand drill 91 is employed as a power source. The drill rests in a suitably mounted socket 92, with its shaft extending upwardly, and carries a spindle 93 with a pulley 94 non-rotatably mounted thereon. A flexible belt 95 transmits power from the pulley 94 to the pulley 82 which causes the spindle 84 to rotate and drives the bandsaw blade by pulley 83. As will be evident from the foregoing, the bandsaw blade 89 can be raised by the handles 74 and brought into sawing contact with a length of molding 101 that is clamped between the fences 51 on the table or bench 39 and projects therefrom. The molding 101 may be secured in position by the dogs 103, each of which, at one end thereof, bears against the molding and at its other end engages in one of a plurality of recesses 104 formed in one of the fences. Bolts 105 are provided to secure the dogs 103 in place against the molding 101.

The tracing assembly 25 comprises a base 107 slidable on the rails 13 and held in position thereon by thumb screws 29. The base 107 is provided with a pair of spaced, hollow, upwardly projecting pillars 109 in which a pair of spaced, depending posts 111 carried by a table 112 are vertically slidable. The table 112 is held in adjusted vertical position by engagement of the thumbscrews 113 carried by the pillars 109 with the posts 111. A horizontally sliding stage 115 with an attached, preferably integral, back 116 is carried on the table 112 for mounting the specimen or sample 117 of molding, the transverse configuration of which is to be duplicated on the end of the molding 101 carried by the table 39. The sample is mounted at an angle of approximately 90° with respect to the molding piece 101. The stage 115 is provided (see FIG. 6) with suitably attached slides 118 on the lower face thereof that are reciprocatable in ways 119 provided in the upper surface of the table 112 and is held in adjusted position in the ways 119 by screws 120 carried by the table. A screw 121 passing through a boss 122 on the lower face of the stage 115 engages in the sample 117 (as best shown in FIGS. 1 and 6) to hold the sample in proper position for tracing its transverse contour.

As an adjunct to the tracing assembly 25, a tracing head is carried by the cutter assembly 23. The tracing head comprises a rigid bracket 124 projecting from the cutting head 71, and preferably integral therewith, toward the tracing assembly. The bracket 124, as shown, is provided with a vertically disposed boss 125 in which there is mounted a screw 126 having a knurled nut 127 therein. The screw 126 is provided with a recess in its periphery in which there is received a pointed tracing needle or pointer 128 which has a smooth, rounded end of reduced, quite small diameter. The needle or pointer 128 projects from the boss 125 through an arcuate slot 129 in the side of the boss and is adapted to contact the sample piece of molding 117 held on the tracing assembly table 112. The needle or pointer can be held in adjusted angular position by tightening the nut 127 on the screw 126.

At this point attention is directed to FIGS. 7, 8 and 9 of the drawings. FIG. 9 illustrates a portion of a room ceiling 131, portions of the adjoining side walls 132 and 133 of said room, and portions or sections 135 and 136 of the coping provided at the junctures of the ceiling and said side walls 132 and 133, respectively. At the corner, designated generally by the numeral 137, where the molding sections 135 and 136 meet, the problem previously discussed is encountered. To form a mitered joint in molding having a complex configuration such as that illustrated herein is a very difficult, expensive task. However, if, as shown in FIG. 8, the end of the molding section or portion 135 is cut at a 90° angle so that it extends squarely into the corner 137 (see FIG. 9), and if the molding portion or section 136 is cut so that its end is a replica of the transverse profile of the portion 135, as shown in FIG. 7, the molding portion 136 may be superposed on the portion 135 in the corner 137 and the appearance will then be, as shown in FIG. 9, substantially identical to that of a mitered joint.

Operation, for example in cutting the molding for a room ceiling, of the apparatus of the present invention is simple. The apparatus is set up with a piece of molding 101 clamped by the dogs 103 between the fences 51 on the table 39 of the work-clamping assembly 19 at the same angle to the vertical that it will have when installed in a room. The assembly 19 is fixed in place by the screw 21. The end of the molding piece 101 should project sufficiently from the table 39 to allow for cutting. Then the cutting head 71 of the cutter assembly 23 is raised so that the bandsaw blade 89 is above the molding piece 101 and the assembly 23 is moved longitudinally to place the blade at the desired point on the molding for starting the cut. The cutter assembly is left free to slide along the rails 13. Another piece 117 of identically configured molding is secured to the stage 115 of the tracing assembly 24, by the screw 121, at the same vertical angle as the molding piece 101. Next, the tracing assembly 25 is moved longitudinally on the rails 13 and adjusted vertically so that the tip of the tracing needle 128 makes contact with the sample molding piece 117 at the top edge of the latter. The assembly 25 is also fixed to the rails 13 after adjustment. The molding piece 117 is oriented transversely of the piece 101 at approximately 90°. The bandsaw blade 89 is then set in motion and the surface contour of the sample molding piece 117 is followed by the needle or pointer 128 as the cutting head is slowly lowered by the operator, using the handles 74.

It is evident that since the cutting assembly 23 is free to slide on the rails 13, the flight of the bandsaw between the pulleys 79 and 82 will be moved along the molding piece 101 as the operator lowers the cutting head 71 on the assembly 23 while maintaining the tip of the needle 128 in contact with the sample molding piece 117. Thus, as seen in FIG. 1, the configuration of the face of the sample molding piece will be duplicated in the end face of the molding piece 101 by the blade 89 so that the two pieces of molding may fit together as shown in FIG. 9. Although it is usually easier and it is preferred to make a cut downwardly through the molding piece 101, as described, it will be obvious that because of the cutting action of the round blade of the bandsaw, the cut can be made in an upward direction.

As is evident from the foregoing description, adjustments are provided in the machine of the present invention for the placement of the sample molding 117. Hence the tracing assembly 23 can be moved on the rails 13 toward or away from the cutter assembly 23 and held in adjusted position by the screws 29. The height of the table 112 of the tracing assembly can be adjusted by sliding the posts 111 in the pillars 109 and the adjustment can be maintained with the screws 113. Also the stage 115 can be moved on the slides 118 to further adjust the position of the sample molding 117. Further, the tracing head carried by the cutting head 71 can be pivoted to produce offset coping.

In FIGS. 10 and 11 a modified form of tracing assembly 25 is illustrated. This modification makes possible still another adjustment, but is quite similar in construction and use to the assembly shown in FIGS. 1, 2, and 6. The posts 145, which correspond to the posts 111 in the embodiment shown in FIG. 6, terminate at their upper ends in perforated ears 146 for cooperation with the spaced ears 148 that project downwardly from the table 149. A long bolt 150 with nut 151 extends through the ears 146 and 148 and serves as a pivot whereby the table 149 can be swivelled in a vertical plane. The sliding stage 115 and the mounting of the sample molding 117 thereon are as in FIG. 6.

From the description above, it is clear that the novel apparatus of the present invention makes it possible to cut molding for a room much easier than has hitherto been possible. Not only is the cutting easier when all of the angles between walls and between walls and the ceiling are exactly 90° but, by reason of the adjustability of the apparatus, it is also easier when one or more of said angles are more or less than 90°. Coping with the present apparatus does not require tedious hand work and can be quickly performed with good accuracy.

It will be understood that details of the apparatus are subject to modification without departing from the spirit of the invention and, therefore, the invention should not be considered as limited to the precise construction described and illustrated, but should be construed as broadly as permitted by the accompanying claims.

I claim:

1. Coping tracing apparatus comprising adjustable means for holding a first piece of molding; second means for adjustably holding a second piece of said molding transversely of said first piece; and a cutter assembly between said adjustable means and said means and movable with respect to said second means, said cutter assembly comprising a round, bandsaw blade adapted to contact said second piece of molding, motor means for operating said saw blade, a tracing head having means for tracing a surface contour of said first piece of molding, and guiding means for moving said cutter assembly with respect to said second piece of molding so that said surface contour is duplicated by said saw blade on the end of said second piece of molding as said surface contour of said first piece of molding is traced.

2. Apparatus as defined in claim 1 wherein means are provided for supporting said adjustable means, said second means and said cutter assembly in alignment.

3. Apparatus as defined in claim 1 wherein said apparatus comprises a base upon which said adjustable means, said second means, and said cutter assembly are mounted.

4. Apparatus as defined in claim 2 wherein said second piece of molding is oriented at substantially 90° to said first piece of molding.

5. Apparatus as defined in claim 4 wherein said tracing head comprises pointed tracing means extending toward said adjustable means and adapted for contact with said first piece of molding.

6. Apparatus as defined in claim 5 wherein said guiding means comprises a handle connected to said tracing head.

7. Apparatus as defined in claim 5 wherein said supporting means comprises an elongated base having longitudinal members upon which said apparatus is movably mounted for horizontal movement; wherein said adjustable means is movable vertically and comprises a table movable longitudinally; wherein said second means is movably mounted for horizontal movement and comprises a bench that is pivoted for movement in a vertical plane parallel to said base; wherein said cutter assembly is horizontally movable and comprises a cutting head, movable with said assembly and also adapted for vertical movement, that supports said tracing head; wherein said tracing head is carried by said cutting head; and wherein said guiding means comprises a handle connected to said cutting head adapted to move said cutter assembly longitudinally and said cutting head vertically.

* * * * *

UNITED STATES PATENT AND TRADEMARK OFFICE
CERTIFICATE OF CORRECTION

PATENT NO. : 4,249,446
DATED : February 10, 1981
INVENTOR(S) : Peter Tallerico, Jr.

It is certified that error appears in the above-identified patent and that said Letters Patent are hereby corrected as shown below:

In claim 1, line five of the patent, the word "second" should be inserted before the second occurrence of the word "means" so that line 5 of claim 1 reads:

"assembly between said adjustable means and said second means"

Signed and Sealed this

Sixteenth Day of June 1981

[SEAL]

Attest:

RENE D. TEGTMEYER

*Attesting Officer*     *Acting Commissioner of Patents and Trademarks*